June 29, 1943. G. H. KOCH 2,322,803
FASTENING DEVICE
Filed Jan. 8, 1942
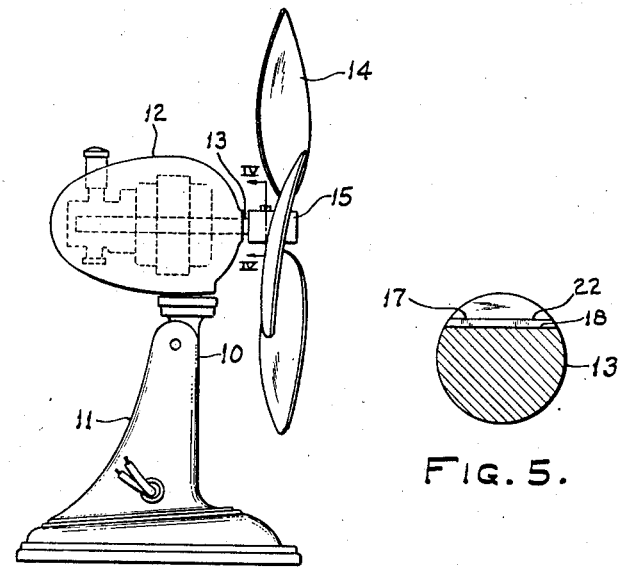
FIG. 1.
FIG. 5.
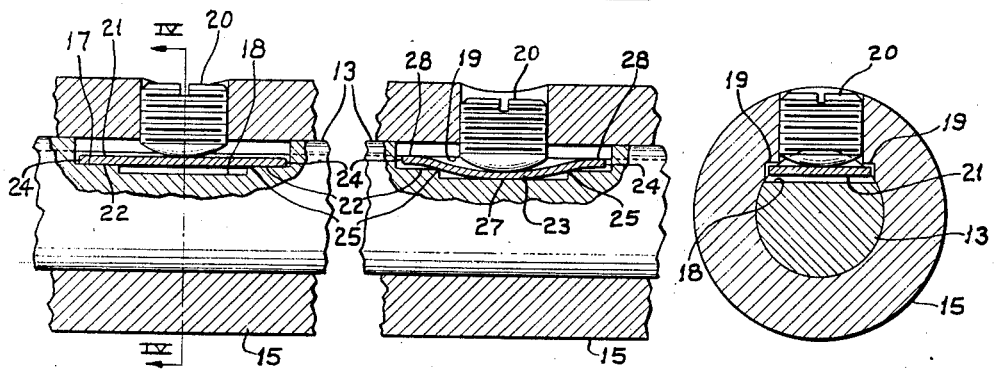
FIG. 2. FIG. 3. FIG. 4.
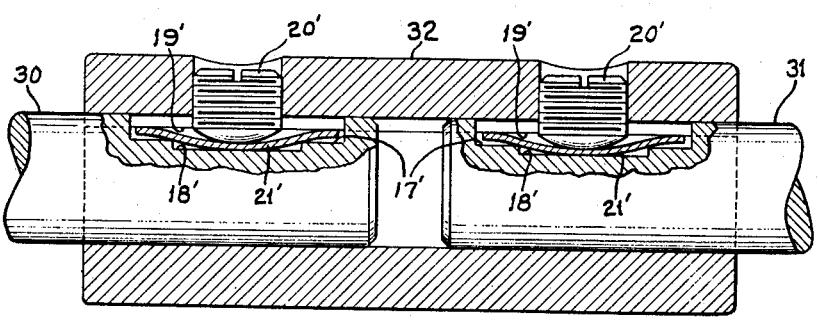
FIG. 6.
WITNESSES:
F. E. Browder
E. H. Lutz
INVENTOR
GUSTAV H. KOCH.
BY
ATTORNEY Patented June 29, 1943

2,322,803

UNITED STATES PATENT OFFICE 2,322,803

FASTENING DEVICE

Gustav H. Koch, Springfield, Mass., assignor to Westinghouse Electric & Manufacturing Company, East Pittsburgh, Pa., a corporation of Pennsylvania Application January 8, 1942, Serial No. 425,957

9 Claims. (Cl. 287—118)

This invention relates to fastening means and more particularly to means for fastening sleeves to rotary shafts.

An object of this invention is to provide improved means for fastening sleeves to rotary shafts.

Heretofore, sleeves have been fastened to rotary shafts by a set screw that engaged a hole in the shaft or a flat spot on the shaft. Due to the rigidity of this structure it is hard to maintain a pressure between the shaft and the end of the set screw. The absence of such pressure results in rapidly increasing looseness and rattling of the sleeve on the shaft. Another objection to this type of connection is that sometimes the sleeve expands faster than the shaft. The result of this is a loose and noisy connection. Accordingly, it is an object of this invention to provide means for attaching a sleeve to a shaft that eliminates these objections.

Another object is to provide means for fastening sleeves to rotary shafts wherein a resilient pressure is maintained between the sleeve and the shaft.

A further object is to provide means for attaching sleeves to rotary shafts which provides a positive connection having substantially noiseless operational characteristics.

These and other objects are effected by the invention as will be apparent from the following description and claims taken in connection with the accompanying drawing, forming a part of this application, in which:

Fig. 1 is a side view of a fan illustrating one application of this invention;

Fig. 2 is an enlarged partial section showing the relation of parts of the fastening means just prior to the completion of the final operation necessary to fasten a sleeve to a shaft;

Fig. 3 is an enlarged partial section showing the relation of parts of the fastening means when fastening a sleeve to a shaft;

Fig. 4 is a section taken along the line IV—IV of Figs. 1 and 2;

Fig. 5 is a section through the shaft alone as seen along line IV—IV of Fig. 2; and, Fig. 6 illustrates how this invention may be applied to connect two shafts.

Referring to the drawing in detail, Fig. 1 shows a fan 10 illustrating one application of this invention. The fan 10 includes a support 11, a motor 12, a shaft 13 rotated by the motor 12, a set of fan blades 14 which are attached to a sleeve 15. A novel arrangement is provided for fastening the sleeve 15 to the rotary shaft 13 so that the fan blades will rotate therewith.

The fastening arrangement includes a stepped notch which is provided by a first notch 17 and a second notch 18 in the shaft 13, a pair of notches 19 in the sleeve 15, a set screw 20 screw-threaded into the sleeve 15, and a flat resilient spring key 21.

The notch 18 is located in the bottom of and intermediate the ends of the notch 17. This arrangement of the notches 17 and 18 provides flat lands 22 between the ends of the notches. These notches may be milled into the shaft 13 with a single operation using a stepped milling tool or they may be formed therein by two separate milling operations using two different width milling tools. The notches 19 in the sleeve 15 complement the notches 17 and 18 in the shaft 13. These notches may be formed in the sleeve 15 by means of a broach or any other suitable means. The notches 17 and 18 have flat bottoms and when assembling the fastening means, the key 21 is placed in the slot 17 with its ends 24 resting on the flat lands 22 as shown in Fig. 2 and the sleeve 15 is slid onto the shaft and the set screw 20 is tightened down against the spring key 21 so as to force the central portion 23 of the key 21 down into the notch 18 as shown in Fig. 3. The portion 23 may or may not be forced down against the flat bottom of the notch 18 depending upon the degree of resiliency desired in the connection. As the set screw 20 is tightened down onto the key, the ends 24 of the key pivot about corners 25 between the slots 17 and 18 and bear against the top wall of the notches 19. The contact between the key and the notches 19 is over four small areas, indicated generally by the reference character 28. This area contact is obtained by the ends of the key flattening out against the top walls of the notches 19 when the set screw 20 is screwed down tight against the key.

The spring key 21 engages the shaft along a line transverse to the shaft at the corners 25 and along a line transverse to the shaft at 27 and the ends of the same, as previously described, engage the sleeve 15 over the small areas indicated at 28. This arrangement maintains a resilient pressure against both the threads of the screw 20 and the shaft 13 which tends to prevent loosening of both the screw 20 and the shaft 13. This arrangement also provides a much greater radial pressure between the sleeve 15 and the shaft 13 than can be applied with a set screw seating in a hole in the shaft or on a flat spot on the shaft 13 because the spring key 21 pivots about the corners 25 as fulcrum points and acts on the well-known principle of the lever to multiply the reaction of the screw 20. It will be noted that the distance from the fulcrum points or corners 25 to the line 27 is greater than the distance from the fulcrum points 25 to the ends 24 of the spring key. Accordingly, since the structure is in equilibrium, the reaction of the spring key 21 on the sleeve over the areas 28 must necessarily be more than one-half the reaction of the screw 20 on the spring key 21, and the reaction at each of the fulcrum points 25 is equal to one-half the reaction of the screw 20 on the key 21 plus the reaction at the two contact areas 28 at each end of the key 21.

Another advantage afforded by this invention is that it provides a plurality of points of positive pressure between the sleeve 15 and the shaft 13. This provides a very stable connection, that is, free from both rotation and wobble.

Still another advantage is that, due to the resiliency of the spring key 21, if the sleeve 15 expands quicker than the shaft 13, the connection between them will remain tight and substantially noiseless.

Fig. 6 illustrates another use for the fastening arrangement just described. In this application of the invention, two aligned shafts 30 and 31 are connected together. Each of the shafts have notches 17' and 18' formed therein near their respective adjacent ends, and a flat resilient spring key 21' is positioned in each of the notches 17'. A sleeve 32 is telescoped over the adjacent ends of the shafts 30 and 31. This sleeve has a pair of notches 19' therein, similar to the notches 19 in the sleeve 15 of the previous embodiment, that complements the notches 17' and 18' in the shafts. A pair of set screws 20' are threaded into the sleeve. The set screws 20' are located opposite the spring keys 21' so that when are screwed down onto the keys 21' the shafts are fastened to the sleeve, and consequently together, in the manner previously described for fastening the sleeve 15 to the shaft 13.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A rotary shaft having a notch therein, a sleeve mounted on said shaft, means fastening said sleeve to said shaft so as to rotate therewith, said means including an initially flat spring key in said notch, and a device carried by said sleeve for applying a force to said spring key to deflect a portion thereof into engagement with said shaft and other portions thereof into engagement with said sleeve.

2. A rotary shaft having first and second notches therein, said second notch being located within the confines of said first notch, a sleeve mounted on said shaft, a spring key positioned in said first notch, means carried by said sleeve for applying force to said spring key to force a portion of said spring key into said second notch and cause the same to engage said shaft and said sleeve at a plurality of points.

3. A rotary shaft having a notch therein, a sleeve mounted on said shaft, a spring key positioned in said notch, means carried by said sleeve for applying pressure to said spring key intermediate its ends, and fulcrum points intermediate the ends of said notch about which the ends of said spring key pivot into contact with said sleeve when pressure is applied to said key.

4. A rotary shaft having first and second notches therein, a sleeve mounted on said shaft, said sleeve having a notch therein complementing said first notch in said shaft, a spring key positioned in said first notch in said shaft, means for forcing a portion of said spring key into said second notch in said shaft, and means causing the ends of said key to engage said complementing notch in said sleeve.

5. A rotary shaft having a notch therein, a sleeve mounted on said shaft, an initially flat spring key positioned in said notch, and means exerting pressure on the central portion of said key and causing the end and intermediate portions of said spring key to apply a resilient force to said shaft and to said sleeve at a plurality of points.

6. A rotary shaft having a shallow notch therein, a sleeve mounted on said shaft, an initially flat spring key positioned in said notch, and means for causing said spring key to engage said shaft at at least two points and to engage said sleeve at at least two points.

7. A rotary shaft having a shallow notch therein, an initially flat spring key positioned in said notch, a sleeve mounted on said shaft, means for causing said spring key to apply a resilient force to said sleeve at at least three points and to apply a resilient force to said shaft at at least two points.

8. A rotary shaft having a stepped notch therein, a spring key positioned in said notch and resting on the steps of the same, a sleeve mounted on said shaft, and means applying a force to said spring key that causes a portion of said key to engage the bottom of said notch and the ends of said key to engage said sleeve.

9. Fastening means for securing a sleeve to a rotatable shaft so as to rotate with said shaft comprising a key positioned in a recess formed between a portion of said sleeve and a portion of said shaft, fulcrum points bearing against said key at points intermediate the center and end portions thereof and means for exerting pressure on the center portion of said key for causing the intermediate and the end portions of said key to press against the adjacent portions of said shaft and said sleeve.

GUSTAV H. KOCH.